A. B. LANDIS.
AUTOMATIC BALANCING MECHANISM.
APPLICATION FILED FEB. 7, 1910.
1,091,851.
Patented Mar. 31, 1914.
5 SHEETS—SHEET 3.
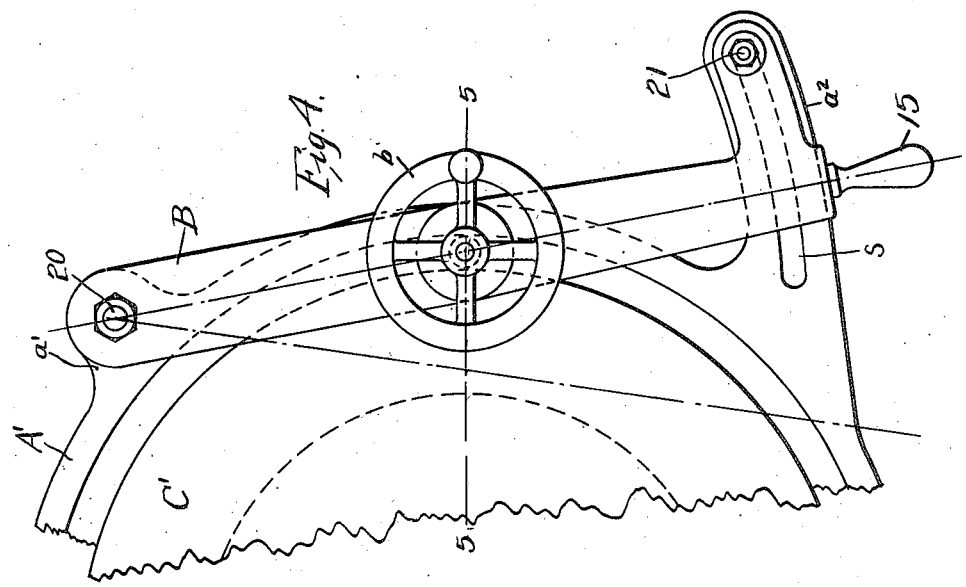
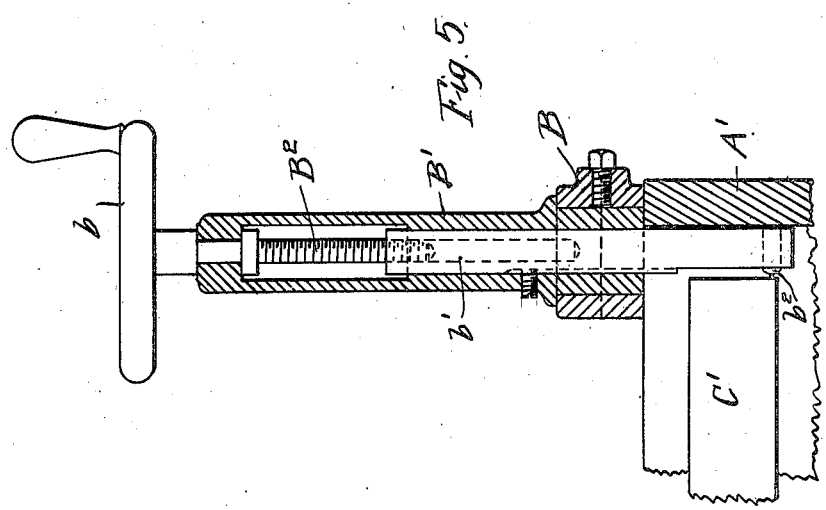
WITNESSES:
L. A. Price.
C. K. Reichenbach.
INVENTOR.
Abraham B. Landis,
BY
ATTORNEY.

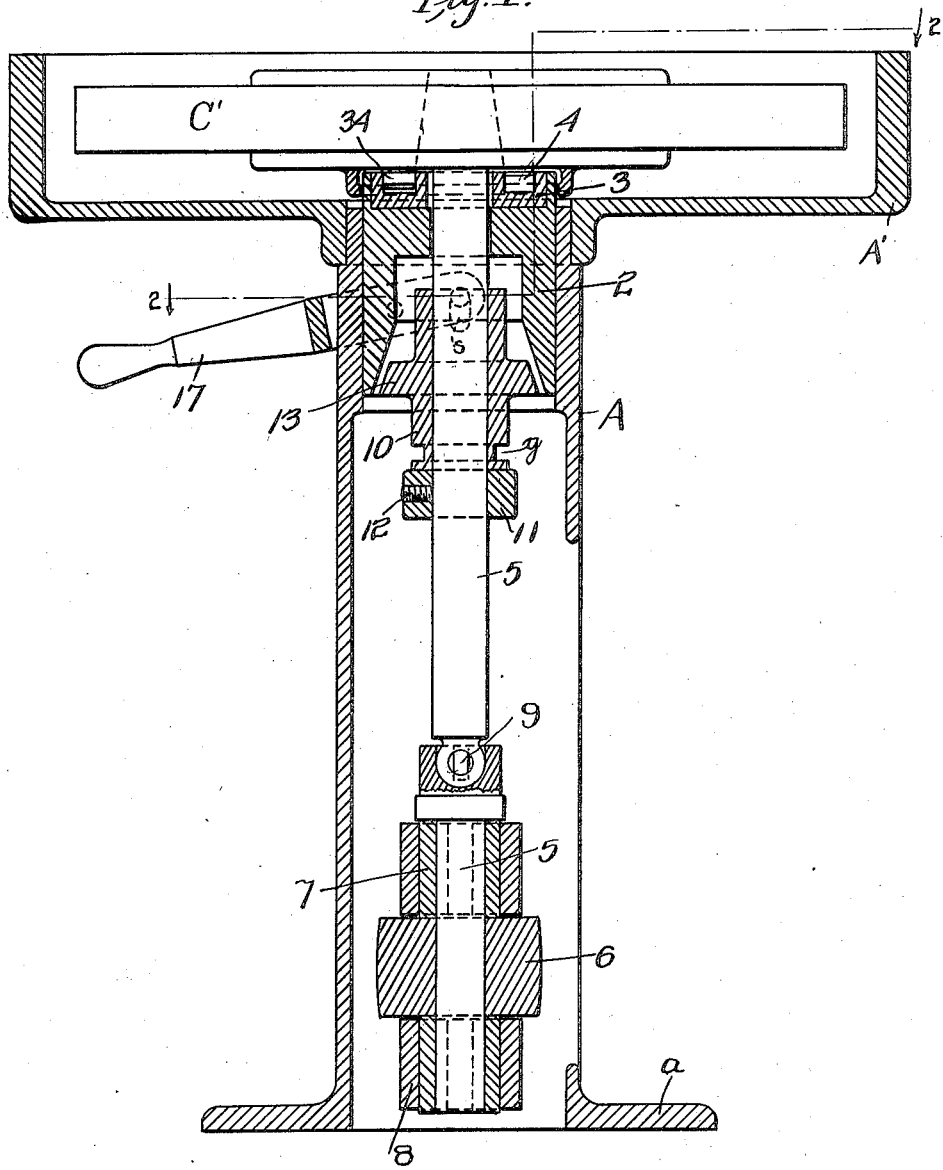

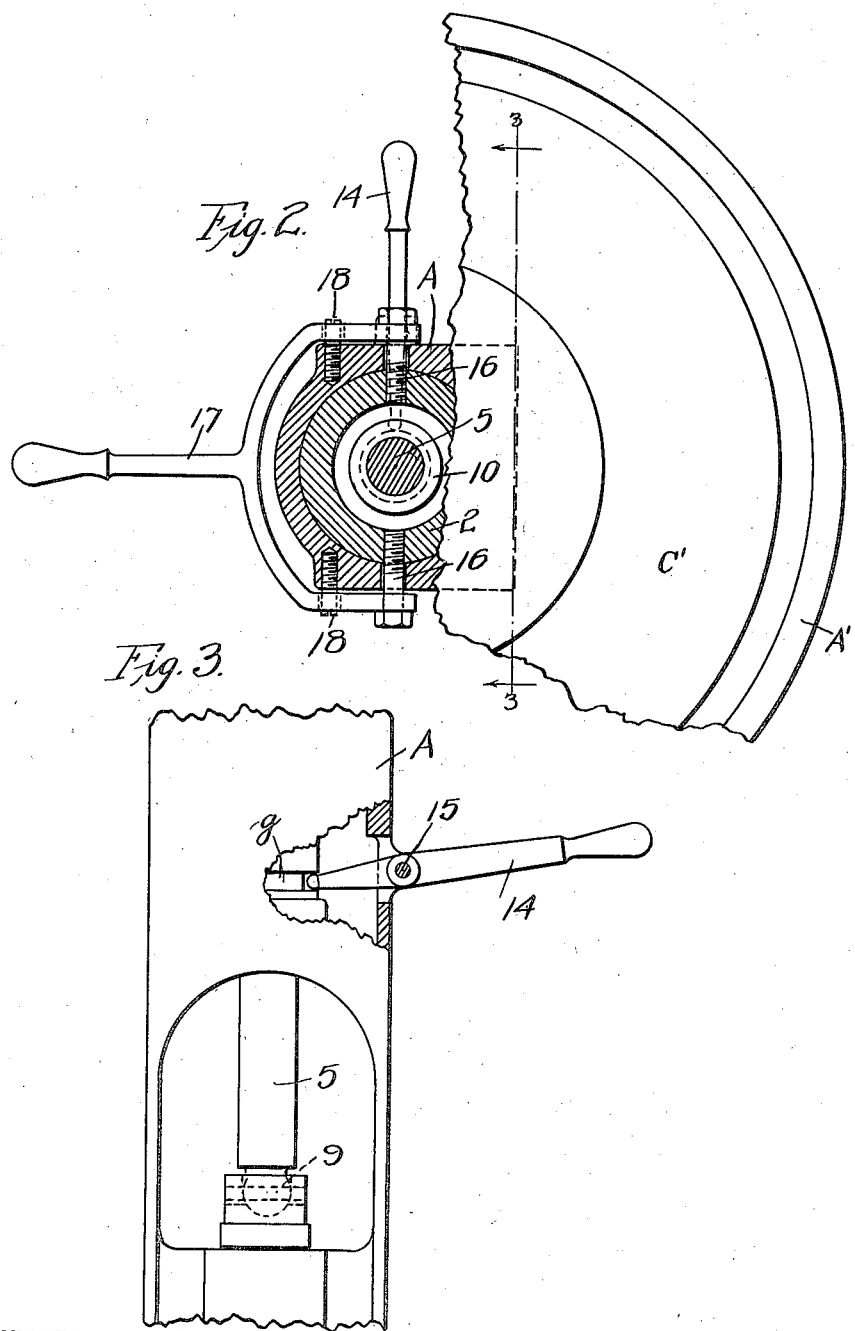

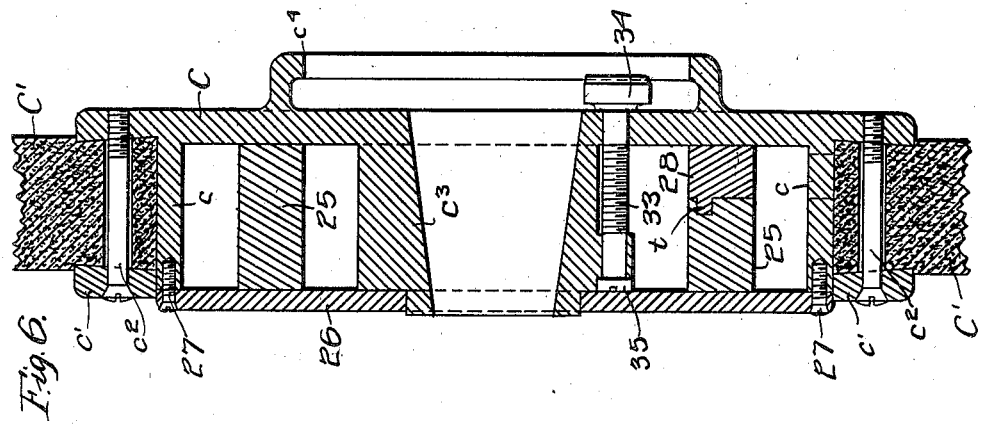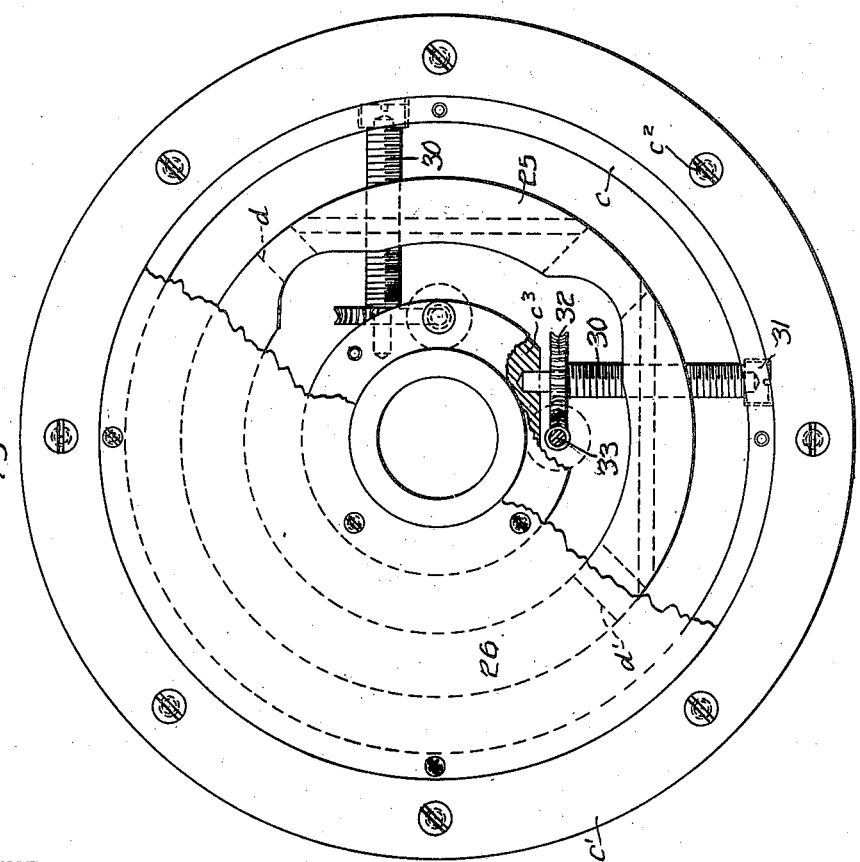

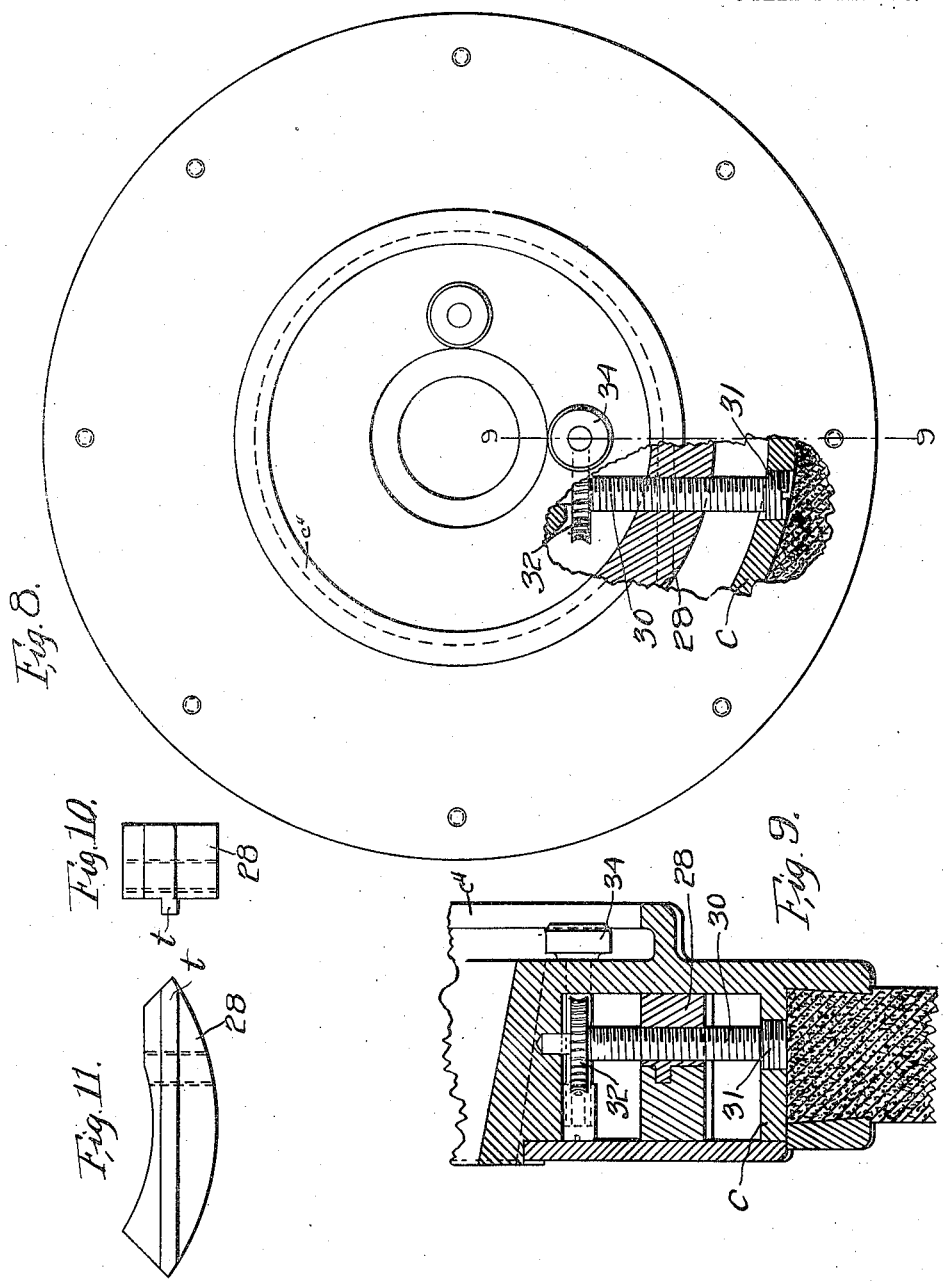

UNITED STATES PATENT OFFICE.

ABRAHAM B. LANDIS, OF WAYNESBORO, PENNSYLVANIA.

AUTOMATIC BALANCING MECHANISM.

1,091,851.

Specification of Letters Patent. Patented Mar. 31, 1914.

Application filed February 7, 1910. Serial No. 542,465.

*To all whom it may concern:*

Be it known that I, ABRAHAM B. LANDIS, a citizen of the United States, residing at Waynesboro, in the county of Franklin and State of Pennsylvania, have invented certain new and useful Improvements in Automatic Balancing Mechanism, of which the following is a specification.

In the use of machines for dressing surfaces employing an emery, or grinding wheel, such as grinding machines, it is of importance that the emery wheel itself, as well as the other parts of the mechanism, shall be perfectly true and exactly balanced so as to run without any waver, "chatter" or vibration and thus insure a perfectly true finished surface when the work is complete. In common constructions of grinding wheels it has been found difficult to obtain a perfectly true and accurately balanced wheel the result being attained only after considerable and rather expensive work.

The object of my said invention is to construct a wheel center, or frame, for carrying the emery wheel proper and provide an apparatus to coöperate therewith for truing and balancing the same which will secure the desired result positively and accurately and also in an automatic manner, all as will be hereinafter more fully described and claimed.

Referring to the accompanying drawings which are made a part hereof and on which similar reference characters indicate similar parts, Figure 1 is a vertical section through the automatic truing and balancing machine showing the grinding wheel in the position which it occupies while the work is being done, Fig. 2 a view partly in top plan and partly in horizontal section as seen when looking downwardly from the dotted line 2—2 in Fig. 1, Fig. 3 a detail view of a part of the stand of the machine as seen when looking in the direction indicated by the arrows from the dotted line 3—3 in Fig. 2, both the top and lower portions of the machine being broken away, Fig. 4 a top or plan view of one edge of the top of the stand showing the diamonding tool for truing the face of the grinding wheel thereon in position for use, Fig. 5 a detail section on the dotted line 5—5 in Fig. 4, Fig. 6 a central transverse section through the grinding wheel center, or frame, and a portion of the grinding wheel the outer part thereof being broken away in order to show the central portion of the wheel on a large scale, Fig. 7 an outside plan view of the wheel showing a part of the outside plate removed so that the interior structure may be seen, Fig. 8 an inside face view of the wheel showing a portion of the plate broken away to show the interior structure, Fig. 9 a detail section on the dotted line 9—9 in Fig. 8, and Figs. 10 and 11 details showing an end and face view respectively of the adjusting nut or block.

In said drawings the portions marked A represent the stand, or frame, of the balancing machine, B the frame of the diamonding tool and C the frame or center of the grinding wheel. The machine comprises the stand A which is a hollow vertical casting of appropriate dimensions formed with a suitable base $a$ and with a top A' which is bowl-shaped and of sufficient size to surround the emery wheels which are to be dressed therein, the sides extending up a sufficient distance to protect the operator against the flying grit and water while the face of the wheel is being dressed. It is also made heavy, as shown, to afford sufficient strength to protect the operator from flying parts should any wheel being operated upon burst during the operation. Said top A' is mounted directly upon the top of the stand A being preferably formed with a central perforation of appropriate size to slide over said top and rest upon a shoulder near the upper end thereof as shown most clearly in Fig. 1. A sleeve 2 is mounted to slide in the upper end of said stand and project to within said top A' the upper end of said sleeve being formed with a circular recess in which is mounted an annular bearing plate 3 in which is formed an annular bearing groove 4 for a purpose to be presently described. The interior face of said sleeve, at its lower end, is formed tapered, as shown. A spindle 5 having a driving pulley 6 near its lower end is mounted in suitable bearings 7 and 8 on either side of said pulley. Said spindle is formed in two parts its upper end being connected to its lower end by a universal joint 9 for a purpose to be presently described. Another bearing 10 is mounted on the upper part of spindle 5 being normally adapted to rest on the top surface of a collar 11, which is rigidly secured to said spindle 5 by a set screw 12. Said bearing 10 has a circumferential flange 13 the outer edge of which is formed with a tapered face corresponding to the tapered inner face of the sleeve 2, with which it may be caused to engage by bearing down upon a lever 14, which is mounted on a pivot 15 on the side of the stand A and engages at its inner end in a circumferential groove $g$ which is formed in the outer face of bearing 10 near its lower end. The sleeve 2 has screws, or bolts, 16 inserted in its sides diametrically opposite each other which project through slots $s$ in the sides of stand A and engage with the inner ends of the respective branches of a bifurcated lever 17, which is mounted on pivots 18, which extend into the opposite sides of the stand A near its outer edge. By this arrangement sleeve 2 may be slid downward so that its tapered face will engage the tapered face of flange 13 of bearing 10, or said bearing 10 may be slid upward to effect the engagement, as may be preferred, and for a purpose to be hereinafter described.

The diamonding tool frame B consists of a swinging arm pivoted at one end on a pivot 20 to an ear $a'$ on one side of the top A'. Its opposite end is provided with a guiding and clamping bolt 21 which engages with a segmental slot $s'$ formed in an outwardly projecting arm $a^2$ on the same side of the top A' but at a point on the opposite side of the axis of the spindle. Said arm B is formed with a handle 15 by which the operator may hold the same to carry the diamonding tool in contact with the face of the grinding wheel, or it may be clamped in position to do the work by the bolt 21. At a point in line with the axis of the wheel to be dressed said arm A is provided with a vertical socket B' in which is mounted a sliding bar $b'$ which projects through said socket and carries near its outer end the diamond supporting block $b^2$. A screw B² engages with a screw-threaded perforation in the outer end of the bar $b'$ and is mounted to turn in the outer end of the socket B', being provided with a crank wheel $b$ on its outer end by which the operator may rotate said screw and thus slide said bar to traverse the diamond back and forth across the face of the wheel, as may be desired, the tool being held to the face of the diamonding wheel with the other hand by means of the handle 15, or secured by the screw 21, as before described.

The grinding wheel center C is a cast metal disk of appropriate dimensions and is provided with an annular flange $c$ near its outer edge leaving a seat on the outer face of said flange for the inner edge of the annular emery wheel C', which is clamped in place by an annular clamping ring $c'$ and clamping bolts $c^2$. In the center of said disk C is formed a hub $c^3$ having a conical opening or bearing adapted to be seated upon a correspondingly shaped arbor, both on the balancing machine and on the grinding machine. While I have shown a conical bearing and a conical arbor to receive the same it will be understood that this is only a preferred form. Between the annular flange $c$ near the outer edge of center C and the hub $c^3$ at its center is mounted an annular radially adjustable balancing ring 25 and to the outer face of the flange $c$ and hub $c^3$ is secured a plate or cover 26 which is secured in place by screws 27 inserted through said plate or cover near its edge into screw-threaded perforations formed in the outer edge of said flange $c$. When said plate 26 is firmly seated by said screws 27 it is adapted to bear against the adjacent edge of ring 25 and clamp it securely in fixed position. One side of said balancing ring 25 is recessed for substantially one-half its circumference, as from the point indicated by the dotted line at $d$ on one side to the dotted line $d'$ on the opposite side of the wheels, as shown in Fig. 7. Blocks or nuts 28 of substantially the form of segments of said ring are mounted in said recess and secured on said ring by means of an interengaging tongue and groove, the tongue being shown as formed on each block 28 and engaging with a groove in the ring 25, said tongue being indicated in Figs. 6, 10 and 11 by the reference letter $t$. The tongue-and-groove connection between the blocks 28 and the balancing ring 25 is as best indicated by dotted lines in Fig. 7 the groove for the engagement of one block extending in a line exactly at right angles with the groove for the engagement of the other block. Each of said blocks 28 is formed with a transverse screw-threaded perforation and a screw 30 is mounted in said perforation in each block, being seated at its outer end in a suitable seat 31 in the flange $c$ and at its inner end in a suitable seat formed in the hub $c^3$. Said seats 31 are preferably suitable collars, or screw-plugs, with an appropriate seat and formed with exterior screw-threads and screwed into perforations formed in said flange. A worm wheel 32 is mounted on each of said screws 30 and engages with a thread on a screw-shaft 33 which is mounted at its inner end in a journal in one side of the hub $c^3$ and at its outer end extends through the plate C and is provided with a friction wheel or roller 34 on its outer end. A screw 35 is tapped into the inner end of said screw-shaft 33 the head of said screw 35 forming a shoulder between which and the shoulder on the outer end adjacent to the wheel 34 said shaft is held to rotate in its journals. The central portion of said screw-shaft is threaded, as shown. The arrangement of the two blocks 28 and the means for operating them is identical in each instance except that one is arranged at right angles with the other. It will thus be seen that the rotation of one screw 30 by the turning of the appropriate screw-shaft 33 will move that block 28 with which it engages in line with the radius of the wheel and carry with it the balancing ring 25 which is connected therewith by the tongue-and-groove connection. As one block 28 carrying the ring 25 moves in one direction said ring 25 slides on the other block 28, as one tongue-and-groove connection is at right angles with the other tongue-and-groove connection. It will thus be seen that the turning of screws 30 is adapted to carry the balancing ring in any direction in relation to its axis necessary to balance the wheel.

In operation, a grinding wheel of the form shown in Figs. 6, 7 and 8 is put into the tool, or machine, shown in Fig. 1, for the purpose of truing and balancing the same, by placing the conical bearing in the hub $c^3$ over the tapered arbor on the top of spindle 5. The frictional contact will be sufficient to cause said wheel to rotate with said arbor. The plate 26 is loosened to leave ring 25 free to slide. The wheels 34 on the screw-shafts 33 are adapted to just fit within the annular groove 4 in the bearing plate 3 on the upper end of sleeve 2. The sleeve 2 is slid downward until its inner tapered face impinges against the outer tapered face of the flange 13 on the bearing 10, or bearing 10 is slid upward to secure the engagement, which holds said bearing 10 rigidly to said sleeve and thus affords a rigid bearing within which the upper end of spindle 5 may run, so as to avoid any vibration and hold the work (the grinding wheel) steady on its arbor. The diamonding tool shown in Figs. 4 and 5 is then brought into position so that the point of the diamond will touch the face of the wheel and is held in this position while the operator turning crank $b$ traverses said diamond point back and forth across said face until the face is dressed perfectly true. The diamonding tool is then run up to carry the lower end of the bar $b'$ above the top face of the wheel, out of the way. The sleeve 2 is then raised by means of lever 17, or bearing 10 is lowered by means of lever 14, so that said bearing 10 is released therefrom to allow the upper end of spindle 5 to run loosely or "wabble" if necessary. The friction wheels 34 being now engaged by the annular groove 4 of the bearing plate 3 and the arbor 5 being in rapid rotation any unevenness in the weight or any unbalance of the wheel will cause said wheel to run toward one side or the other of the groove and turn said friction wheels 34 and the screw-shaft 33, which, through the worm wheels 32, turn screws 30 and thus operates to slide the balancing ring 25 toward the point of equilibrium. When this point is reached and the wheel is perfectly balanced the rollers or wheels 34 will run true in the groove 4 and will therefore not be rotated by frictional contact. The machine will then be stopped and plate 26 tightened against the outer face of ring 25 by means of the screws 27 so as to clamp said balancing ring in this exact position thus insuring a perfectly balanced and true grinding wheel. The grinding wheel when put into use is put on the grinding machine spindle in the same manner that it is mounted upon the spindle 5 the projecting flange $c''$ serving to protect the friction wheels 34 and also as a dust and water guard for the bearing.

While I have shown the diamonding tool on the machine, and regard it as of special advantage in the apparatus as it enables the wheel to be first tried and dressed and then balanced, it will be understood, of course, that the balancing mechanism may be used independently.

When it is desired to have the top of spindle 5 held rigid, as for testing after balancing, bearing 10 may be slid upward by lever 14 to engage the tapered face of flange 13 with the tapered inner face of sleeve 2, which will secure the result without dropping bearing 3 out of engagement with wheels 34, as will be readily seen.

Having thus fully described my said invention, what I claim as new and desire to secure by Letters Patent, is:

1. A balancing machine comprising a rotary arbor formed in two parts connected by a flexible joint, means whereby said jointed part may be held rigid or allowed to wabble, the part to be balanced mounted on said arbor, a balancing ring in said part, means for adjusting said balancing ring, and a connection between said means and a bearing around said arbor, substantially as set forth.

2. A balancing mechanism comprising the device to be balanced, an adjustable weight carried by the device to be balanced, means for adjusting said weight, a rotary part carrying said device to be balanced, a bearing surrounding the axis thereof, and a connection between the means for adjusting said weight and said bearing, whereby said means is operated, substantially as set forth.

3. A balancing mechanism comprising the part to be balanced, a weight carried by said part and mounted to be adjustable in relation to its axis, means for securing and adjusting said weight, a rotary part on which said part to be balanced is mounted, a frictional bearing surrounding the axis thereof, and friction wheels connected with the means for adjusting said weight mounted in said frictional bearing, said wheels being adapted to bear upon one side or the other of said bearing according to the unbalance of the part to be balanced, substantially as set forth.

4. A balancing mechanism comprising the part to be balanced, a shiftable solid weight carried thereby, means for revolving said part to be balanced, and means for automatically and mechanically adjusting said weight to the point of the equilibrium by the rotary motion of said part, substantially as set forth.

5. A balancing mechanism comprising the part to be balanced, a shiftable weight carried thereby, means for revolving said part to be balanced, and means operated by the rotary motion for mechanically adjusting said shiftable weight bodily, substantially as set forth.

6. A balancing mechanism comprising the part to be balanced, a weight carried by said part to be balanced, means for mechanically adjusting said weight radially on said part, means for revolving said part, and means for operating the adjusting mechinism, substantially as set forth.

7. A balancing mechanism comprising the part to be balanced, means for revolving said part, a shiftable weight carried by said part, means for shifting said weight bodily in relation to the axis of said part, and means for operating the shifting mechanism arranged to be operated by the rotary motion and inequilibrium of said part, substantially as set forth.

8. A balancing mechanism comprising the part to be balanced, a weight carried by said part and mounted to be secured and adjusted thereon by screws, and means for operating said screws by the rotary motion and inequilibrium of said part, substantially as set forth.

9. A balancing mechanism comprising the part to be balanced, a shiftable weight carried by said part and connected therewith by sliding connections extending at right angles with each other, screws for holding and adjusting said connections, means for operating said screws, means for imparting a rotary motion to said part to be balanced, and a connection between said means for operating the screws and a bearing surrounding the axis of the revolving part, whereby the rotary motion and the unbalance of the part to be balanced will operate said screws to slide the weight to the point of equilibrium, substantially as set forth.

10. A balancing mechanism comprising the part to be balanced, a movable solid weight mounted thereon, means for automatically moving said weight to the point of equilibrium, said means being operated by the rotary motion of said part, substantially as set forth.

11. A balancing mechanism comprising the part to be balanced, a movable weight carried by said part and connected therewith by sliding connections running at right angles with each other, screws for holding and adjusting said weight, a worm gear and screw-shaft for operating said screws, means for imparting a rotary motion to said part to be balanced, and a frictional contact between said screw-shafts and a bearing around the axis of the machine, substantially as set forth.

12. A balancing mechanism comprising the part to be balanced, an annular weight surrounding the axis of the part to be balanced and connected therewith by sliding connections, a screw-and-worm gear for adjusting said part, means for adjusting said weight, means for imparting rotary motion to said part and a frictional engagement between said gear and a bearing surrounding the axis of the machine, substantially as set forth.

13. A balancing mechanism comprising the part to be balanced, an annular weight mounted around the axis thereof to be moved in any direction thereon, means for imparting a rotary motion to said part to be balanced, and means for moving said annular weight to the point of equilibrium by the rotary motion of said part, substantially as set forth.

14. A balancing mechanism comprising the part to be balanced, a balancing weight mounted to move thereon, mechanism for positively moving said weight by the rotary motion thereof, means for imparting the rotary motion, and means for securing said weight in adjusted position, substantially as set forth.

15. A balancing mechanism comprising the part to be balanced, a movable weight mounted thereon, means for moving said weight by the rotary motion of said part, means for imparting a rotary motion to said part comprising a vertical spindle adapted to receive said part on its upper end, said upper end being mounted in a bearing adapted to be held rigid or left free to vibrate, substantially as set forth.

16. A balancing mechanism comprising the part to be balanced mounted on a vertical spindle, said spindle formed jointed and arranged with its upper end to wabble, a balancing weight mounted to slide on said part to be balanced, means for sliding said weight to the point of equilibrium and means for operating said sliding part arranged to be operated by the rotary motion of said part, substantially as set forth.

17. A balancing mechanism comprising the part to be balanced mounted on a vertical spindle, said vertical spindle formed in two parts connected by a universal joint, the upper end of said spindle being mounted in a box, adjustable means for securing said box or leaving it free to vibrate, a balancing weight movably connected with said part to be balanced, and means for moving said weight to the point of equilibrium by the rotary motion thereof, substantially as set forth.

18. A balancing mechanism comprising a vertical spindle, a part to be balanced mounted on the upper end thereof, a bearing box mounted around the upper end of said spindle and arranged to be secured or allowed to vibrate, a grooved bearing ring encircling the upper end of said spindle, a balancing weight connected with said part to be balanced, mechanism for moving said balancing weight to the point of equilibrium, and a friction connection between said grooved ring and said mechanism, whereby the same is operated by the rotary motion of said part, substantially as set forth.

19. A bearing mechanism comprising a vertical spindle, a part to be balanced mounted on its upper end, an upper bearing box for said spindle, means for securing said bearing box in a steady position or in a position to vibrate, means for imparting rotary motion to said spindle, the balancing mechanism connected with said part to be balanced, and means for operating said balancing mechanism by frictional contact operated by the rotary motion and unbalance of the part to be balanced, substantially as set forth.

20. A balancing mechanism comprising a rotary part, a part to be balanced mounted thereon, a shiftable balancing weight carried by said part to be balanced, means for shifting said balancing weight in relation to the axis of said part to be balanced, and a connection between said means and a bearing surrounding the axis of the spindle, whereby the same is operated by the rotary motion and unbalance of said part, substantially as set forth.

In witness whereof, I have hereunto set my hand and seal at Washington, District of Columbia, this 5th day of February, A. D. nineteen hundred and ten.

ABRAHAM B. LANDIS. [L. S.]

Witnesses:
J. D. YOAKLEY,
E. W. BRADFORD.